(12) United States Patent
Wang et al.

(10) Patent No.: US 7,541,728 B2
(45) Date of Patent: Jun. 2, 2009

(54) DISPLAY DEVICE WITH ALUMINATE-BASED GREEN PHOSPHORS

(75) Inventors: Ning Wang, Martinez, CA (US); Yi Dong, Tracy, CA (US); Shifan Cheng, Moraga, CA (US); Yi-Qun Li, Walnut Creek, CA (US)

(73) Assignee: Intematix Corporation, Fremont, CA (US)

( * ) Notice: Subject to any disclaimer, the term of this patent is extended or adjusted under 35 U.S.C. 154(b) by 246 days.

(21) Appl. No.: 11/036,914

(22) Filed: Jan. 14, 2005

(65) Prior Publication Data

US 2006/0158090 A1 Jul. 20, 2006

(51) Int. Cl.
*H01J 1/62* (2006.01)
*C09K 11/77* (2006.01)

(52) U.S. Cl. .............................. 313/485; 252/301.4 R
(58) Field of Classification Search ................. 313/485; 252/301.4 R
See application file for complete search history.

(56) References Cited

U.S. PATENT DOCUMENTS

| | | | |
|---|---|---|---|
| 4,705,986 A * | 11/1987 | Iwama et al. | ............... 313/487 |
| 5,424,006 A | 6/1995 | Murayama et al. | |
| 5,879,586 A * | 3/1999 | Kitamura et al. | ...... 252/301.4 R |
| 6,621,211 B1 * | 9/2003 | Srivastava et al. | ........... 313/503 |
| 6,649,946 B2 | 11/2003 | Bogner et al. | |
| 6,805,600 B2 | 10/2004 | Wang et al. | |
| 6,809,781 B2 | 10/2004 | Setlur et al. | |
| 6,947,130 B2 * | 9/2005 | Mukai et al. | ................ 356/121 |
| 2003/0075705 A1 * | 4/2003 | Wang et al. | ........... 252/301.4 P |

OTHER PUBLICATIONS

Shinoya, S (ed.), Yen, W. (ed.); Phosphor Handbook, CRC Press (1999), pp. 393, 418, 419, and 421.

* cited by examiner

*Primary Examiner*—Nimeshkumar D. Patel
*Assistant Examiner*—Anne M Hines
(74) *Attorney, Agent, or Firm*—Fliesler Meyer LLP

(57) ABSTRACT

Novel aluminate-based green phosphors are disclosed having the formula $M_{1-x}Eu_xAl_yO_{1+3y/2}$, where M is at least one of a divalent metal selected from the group consisting of Ba, Sr, Ca, Mg, Mn, Zu, Cu, Cd, Sm, and Tm; $0.1 < x < 0.9$; and $0.5 \leq y \leq 12$. phosphors are configured to absorb substantially non-visible radiation having a wavelength ranging from about 280 to 420 nm, and emit visible green light having a wavelength ranging from about 500 to 550 nm. In a particular embodiment, the phosphor contains the divalent alkaline earth metals Mg, and Mn may be present as well. A novel feature of the present aluminate-based green phosphors is the relatively narrow range of wavelength over which they can be configured to emit; in one embodiment, this range is from about 518 nm to 520 nm. In an alternative embodiment, the phosphor emits visible light with a peak wavelength having a full width at half maximum of less than or equal to about 40 nm.

19 Claims, 9 Drawing Sheets

DISPLAY DEVICE WITH ALUMINATE-BASED GREEN PHOSPHORS

BACKGROUND OF THE INVENTION

1. Field of the Invention

Embodiments of the present invention are directed in general to novel aluminate-green phosphors (herein referred to as green phosphors). Specifically, embodiments of the present invention are directed to use of the novel aluminate-based green phosphors in display applications, such as for back lighting in liquid crystal displays (LCD's), plasma display panels (PDP's), and cathode ray tube (CRT) displays, but also toward isolated green LED's, white light illumination systems, signal lights, and pointers.

2. State of the Art

Embodiments of the present invention are directed to green phosphors, which provide an alternative to the green LEDs of the art. Green LEDs have the disadvantage of being notoriously less efficient than their UV, blue, and red LED counterparts, and additionally, emitted radiation from a green LED can exhibit a wavelength shift with increasing temperatures, an undesirable characteristic. A green phosphor used in conjunction with a UV to blue light emitting diode that provides the excitation radiation to the phosphor, however, provides a device that addresses many of the problems of the green LED. Such a device takes advantage of the so-called down-conversion process, where UV to blue light emitted from the LED can be converted to green light via the green phosphor. Specifically, such devices utilizing green phosphors can be capable of providing efficiencies compatible to a blue LED, where "efficiency" refers to the number of photons emitted by the phosphor relative to the number of photons initially provided as excitation energy. Of course, it will be understood by those skilled in the art that excitation of an LED is carried out with electric energy, so in this sense "efficiency" means power conversion.

Green phosphors have been previously described in the art. During the early phases of the development of these compositions, it was known that a luminescent material could be generated with a base material into which a suitable activator was incorporated. The base materials were aluminate oxides or silicates of alkaline earth metals, and the activator was the rare earth element europium in a +2 valence state (e.g., $Eu^{2+}$). An early disclosure by H. Lange in U.S. Pat. No. 3,294,699, for example, described a strontium aluminate composition activated with an europium (II) oxide, wherein the amount of the europium oxide added to the strontium aluminate was between about 2 and 8 mol percent. A specific luminescent material was 0.9 $SrO.Al_2O_3.0.03$ EuO, which was shown to emit light in a broad band spectrum having a peak response in the green region of about 520 millimicrons when excited by the mecury line at 365 millimicrons (nanometers).

Subsequent to this disclosure a number of different europium activated aluminate compositions appeared in the literature. These compositions were described in relation to a number of different end-use applications, but considering the so-called quenching effect that the europium in relation to luminescent properties, the amount of the europium that appears in the phosphor compositions has been maintained in the past at relatively low levels.

An illumination system for use as the green light of a traffic light or in automotive display applications has been described in U.S. Pat. No. 6,555,958 to A. M. Srivastava et al. Disclosed in this patent were both silicate and aluminate-based blue-green phosphors, the aluminate-based compositions being generally represented by the formula $AAlO:Eu^{2+}$, where A comprised at least one of Ba, Sr, or Ca. The preferable composition disclosed in this patent was $AAl_2O_4:Eu^{2+}$, where A comprised at least 50% Ba, preferably at least 80% Ba and 20% or less Sr. When A comprised Ba, the phosphor peak emission wavelength was about 505 nm and the phosphor quantum efficiency was "high." When A comprised Sr, the phosphor peak emission wavelength was about 520 and the phosphor quantum efficiency was "fairly high." Thus, it was disclosed by this patent that A most preferably comprised Ba to obtain a peak wavelength closest to 505 nm and to obtain the highest relative quantum efficiency. Further revealed was that in the alkaline earth aluminate phosphor, the europium activator substitutes on the alkaline earth lattice site, such that the phosphor may be written as $(A_{1-x}Eu_x)Al_2O_4$, where $0<x<0.2$. The most preferred phosphor composition was $(Ba_{1-x}Eu_x)Al_2O_4$, where $0<x<0.2$. The compositions disclosed in this patent did not contain magnesium or manganese.

An alkaline earth aluminate compound in which the alkaline earth was a magnesium-containing compound containing no fluorine atoms in its molecules was disclosed in U.S. Pat. No. 5,879,586 to K. Kitamura et al. The rare earth component of this phosphor was cerium and terbium, according to the formula $(Ce_{1-w}Tb_w)Mg_xAl_yO_z$, where $0.03 \leq w \leq 0.6$; $0.8 \leq x \leq 1.2$; $9 \leq y \leq 13$; and $15 \leq z \leq 23$. This terbium containing compound was reported to emit "high-luminance green light," but relative intensities and peak emission wavelengths were not given, and this green light emitting compound did not contain europium as an activating rare earth element. A "high-luminescence blue-green" emitting phosphor based on strontium as the alkaline earth and europium as the activator was expressed by the formula $(Sr_{4(1-w)}Eu_{4w})Al_xO_y$, where $0.01<w<0.6$; $11 \leq x \leq 17$; and $20 \leq y \leq 30$ but again, relative intensities and peak emission wavelengths were not given.

Green phosphors based on thiogallates have been disclosed. In U.S. Pat. No. 6,686,691 to G. O. Mueller et al., a device comprising a green phosphor and a blue LED (the green phosphor absorbing blue light from the blue LED) was disclosed. In one embodiment, the green phosphor was based on a host sulfide material; in other words, a lattice which included sulfide ions. A preferred host sulfide material was a thiogallate such as $SrGa_2S_4$, and when activated by the rare earth europium, the green phosphor $SrGa_2S_4:Eu$ demonstrated a spectrum having a luminous equivalent value of about 575 lm/W at a maximum wavelength of about 535 nm. The dopant (rare earth Eu) concentration in the $SrGa_2S_4$ host was preferably from about 2 to 4 mol %. The blue LED providing the excitation radiation to the green phosphor was an (In,Ga)N diode emitting radiation at a wavelength from about 450 to 480 nm.

A similar strontium thiogallate based phosphor used as a backlight for an LCD has been described by C. H. Lowery in published U.S. application 2004/0061810. In this disclosure, the wavelength-converting material selected to absorb light emitted by the active region of the LED die could be either the strontium thiogallate phosphor described above, or a nitridosilicate phosphor. The strontium thiogallate phosphor had a dominant emission wavelength of about 542 nm. The wavelength-converting material absorbed blue light from the LED die either in a region from about 420 to 460 nm, or, in other embodiments, in a region ranging from about 380 to 420 nm. Again, these devices comprising green-emitting phosphors eliminated problems encountered with green LEDs, such as high temperature stability, and temperature-induced variations in color.

U.S. Pat. No. 6,805,814 to T. Ezuhara et al. describe a green light emitting phosphor or use in plasma displays, the phosphor represented by the formula $M^1_{1-a}M^2_{11-b}Mn_{a+b}O_{18-(a+b)/2}$, where $M^1$ is at least one of La, Y, and Gd, and $M^2$ is at least one of Al and Ga. In cases where the phosphor contains Al (e.g., wherein the phosphor is an aluminate), the alumina has a purity of not less than 99.9%, and a crystal structure of either a alumina or an intermediate alumina such as aluminum hydroxide. The peak emission wavelengths of these green light emitting phosphors was not given. The excitation wavelengths were in the vacuum ultraviolet.

The green phosphors of the prior art suffer from two drawbacks: 1) many emit in a wide band spectrum, which, while generally desirable for achieving a higher color rendering in white light illumination sources, is not appropriate for liquid crystal display (LCD) backlighting, plasma display panels (PDPs) and cathode ray tubes (CRTs), and 2) the luminescent intensity (e.g., brightness) and conversion efficiency of the prior art green phosphors is less than adequate. A "wide band spectrum" for the present purposes may be described as a peak in a spectrum demonstrating a full width at half maximum (FWHM) greater than about 80 nm. For display applications, the color space is dependent on the positions of the individual red (R), green (G), and blue(B) components as represented by their color coordinates. To achieve a larger color space, or "wide color gamut display," as it is known in the art, it is desirable to provide a green phosphor that emits at a peak wavelength of about 520 nm, the peak having a FWHM preferably less than about 80 nm, and with the bandwidth of the spectrum covering at least some of the turquoise color, without sacrificing illumination intensity.

Therefore, what is needed in the art is a green phosphor having color coordinates around the values of x=0.193 and y=0.726, a peak emission wavelength around 518 nm wherein the phosphor emits in a narrow wavelength range, and an emission intensity greater than that provided by any known green phosphor in the art. In combining the present green phosphors with a high efficiency UV and blue GaN based LED, a color stable and highly efficient green LED may be provided.

SUMMARY OF THE INVENTION

Embodiments of the present invention are directed toward aluminate-based green phosphors having the general formula $M_{1-x}Eu_xAl_yO_{1+3y/2}$, wherein M is at least one of a divalent metal selected from the group consisting of Ba, Sr, Ca, Mg, Mn, Zn, Cu, Cd, Sm, and Tm; and where 0.1<x<0.9, and $0.5 \leq y \leq 12$. In one embodiment of the present invention, M may be represented by M' Mg. In another embodiment, $0.3 \leq x \leq 0.6$. The aluminate-based phosphors of the present embodiments are configured to absorb radiation in a wavelength ranging from about 280 nm to 420 nm, and emit visible light in the wavelength ranges 500 nm to 550 nm, 515 nm to 530 nm, and 518 nm to 520 nm. These aluminate-based green phosphors may emit visible light with a peak wavelength having a full width at half maximum of less than or equal to about 80 nm in some embodiments, and about 40 nm in other embodiments.

The aluminate-based green phosphors of the present invention have various aluminate host structures. There may be several aluminate structures present at the same time in any one phosphor, where the different aluminate structures are manifested as different phases. In one embodiment of the present aluminate-based green phosphor the value of y=3.5, such that the formula of the phosphor is $(M_{1-x}Eu_x)_4Al_{14}O_{25}$.

The present aluminate-based green phosphors may contain magnesium, such that the general formula of the $M_{1-x}Eu_x$-$Al_yO$ becomes $M_{1-x-w}Mg_wEu_xAl_yO_{1+3y/2}$, where 0<w<1.

For the case where M is manganese (Mn), the general formula of the phosphor is $Mn_{1-x-w}Mg_wEu_xAl_yO_{1+3y/2}$. Particular examples of these phosphors are $Mn_{0.5-w}Mg_wEu_{0.5}Al_yO_{1+3y/2}$, where $0.0 \leq w \leq 0.5$ and $2 \leq y \leq 5$. In other embodiments, $0.2 \leq w \leq 0.3$ and $2 \leq y \leq 5$; w=0.2 and $2 \leq y \leq 5$; w=0.25 and $2 \leq y \leq 5$; w=0.3 and $2 \leq y \leq 5$. The aluminate phase of the phosphors may be defined by the value of y, such that when y=2, the formula of the phosphor is $Mn_{0.5-w}Mg_wEu_{0.5}Al_2O_4$; when y=3.5, the phosphor is $Mn_{0.5-w}Mg_wEu_{0.5}Al_{3.5}O_{6.25}$; when y=4 the phosphor is $Mn_{0.5-w}Mg_wEu_{0.5}Al_4O_7$; when y=5 the phosphor is $Mn_{0.5-w}Mg_wEu_{0.5}Al_5O_{8.5}$. Other exemplary phosphors are $MgMnEu_2Al_{14}O_{25}$ and $Mg_{0.6}Mn_{0.4}EuAl_{10}O_{17}$.

Embodiments of the present invention include visible radiation emitted from the above described phosphors, and a green phosphor-based LED comprising the above described phosphor. Further embodiments include display devices based on the present green phosphors, where the display devices include RGB backlight displays, televisions, monitors, cell phones, personal digital assistants (PDAs), navigation displays, games, decorative lights, and signs. The present aluminate-based green phosphors offer advantages to the display industry in general, and to red-blue-green (RGB) backlighting applications in particular, because the power conversion efficiency of a green LED based on the present green phosphor is better matched to that of the red and blue component LEDs of the backlighting system. Additional advantages are that only one green LED is needed in each RGB unit, instead of the two or more green LEDs that are sometimes required in current RGB display backlighting systems.

DETAILED DESCRIPTION OF THE INVENTION

Embodiments of the present invention are directed in general to novel aluminate-green phosphors (herein referred to as green phosphors). The novel aluminate-based green phosphors of the present embodiments are particularly useful in various display applications. These display applications include, but are not limited to, back lighting in liquid crystal displays (LCD's), plasma display panels (PDP's), and cathode ray tube (CRT) displays. Additionally, they are applicable to any isolated green LED use, such as in decorative lights, signage lights, signal lights and pointers, and may be useful in white light illumination systems as well.

Prior to discussing the chemical nature of the present aluminate-based green phosphors in detail, it may be useful to provide a generalized discussion of how such phosphors may fit into the world of RGB display applications. This may be done schematically by making reference to FIGS. 1A-C, as well as FIG. 2.

Figure 1A:
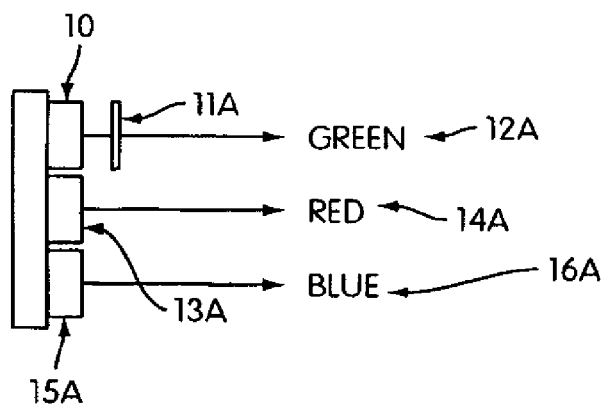
FIG. 1A is a schematic representation of one embodiment of the present illumination system for display applications, wherein a substantially non-visible (380 to 420 nm) LED is used to excite a green phosphor (thus replacing the green LED of the prior art), and wherein the presently efficient green phosphor-based LED is configured to substantially match power conversion efficiency with the blue and red LEDs that have also been used in the display.

FIG. 1A is a schematic representation of one embodiment of the present illumination system for display and RGB blacklight applications. Referring to FIG. 1A, an ultraviolet (UV) light emitting diode (LED) chip 10 is used to supply excitation radiation to an exemplary aluminate-based green phosphor 11A of the present invention, wherein the UV LED 10 emits light substantially in the non-visible region 380 to 420 nm of the electromagnetic spectrum. Green light 12A is emitted from the phosphor 11A as a result of a wavelength conversion of the light absorbed from the UV LED 10. Also shown schematically as part of the display backlighting in FIG. 1A is a red LED chip 13A which emits red light 14A, and a blue LED chip 15A emitting blue light 16A. The purpose of the design of the configuration shown in FIG. 1A, and the choice of the present aluminate-based green phosphor 11A, is to substantially match the light intensity output of the green light 12A in the display with that of the red light 14A and the blue light 16A.

Figure 1B:
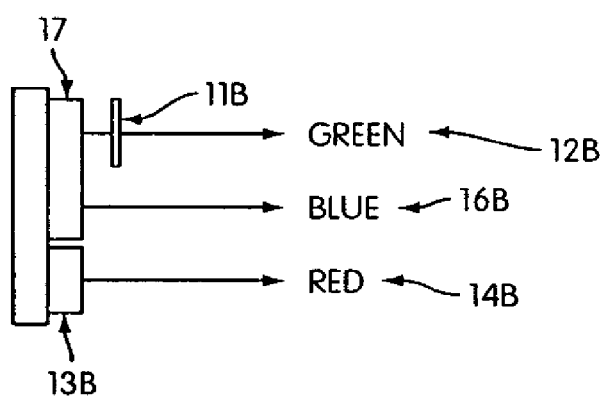
FIG. 1B is a schematic representation of another embodiment of the present illumination system for display applications, this time using a visible blue LED (operating at about 420-450 nm) to excite a silicate-based green phosphor and to provide green light from the green phosphor, and the unabsorbed blue light, the red LED being the same as in FIG. 1A.

FIG. 1B is a schematic representation of another embodiment of the present illumination system for display applications, this time using a visible blue LED 17 to excite an aluminate-based green phosphor 11B such that green light 12B contributes to the backlighting portion of the display. The visible blue LED 17 emits light at a wavelength greater than about 420 nm, and in a particular embodiment, at a wavelength of about 450 nm. The novel aluminate-based green phosphor 11B may or not be the same phosphor as the green phosphor 11A shown in FIG. 1A. In some embodiments, the green phosphor 11B may be a silicate-based green phosphor, or combination of silicate and aluminate-based green phosphors. Similar to the previous case, the red light 14A is produced from a red LED 13A.

Figure 1C:
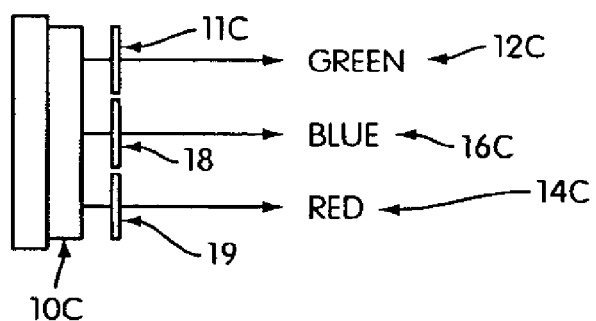
FIG. 1C is a schematic representation of another embodiment of the present illumination system for display applications, this time using an identical non-visible 380 to 420 nm radiation source to excite three different red, green, and blue phosphors.

FIG. 1C is a schematic representation of yet another embodiment of the present illumination system for display applications, this time a single radiation source to excite three different phosphors. In this case, a UV LED 10C provides the same non-visible 380 to 420 nm radiation to the present aluminate-based green phosphor, a blue phosphor 18, and a red phosphor 19. The green phosphor 11C emits green light 12C; the blue phosphor 18 emits blue light 16C, and the red phosphor 19 emits red light 14C.

In each of the configurations represented by the schematic diagrams of FIGS. 1A-C the green light of the backlight display is emitted from a green phosphor, but the manner in which the red light and the blue light is generated varies. In some cases the red and/or blue light may come directly from an LED of the appropriate wavelength; in other cases, the red light and/or blue light may be emitted from a phosphor.

Figure 2:
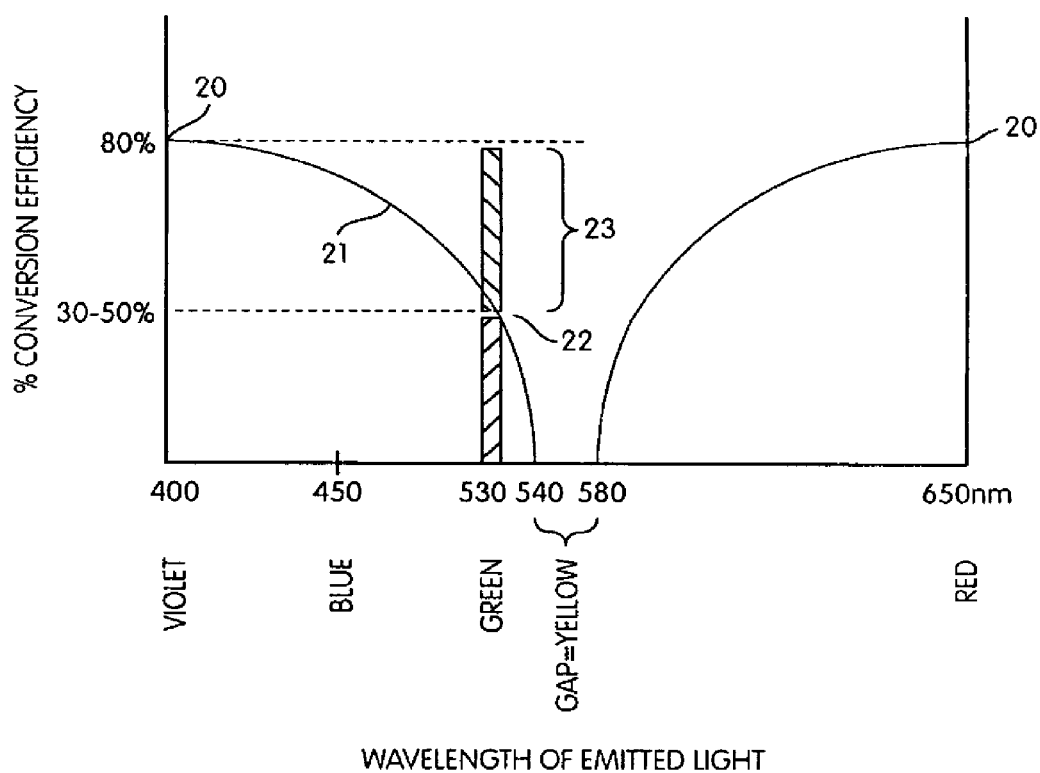
FIG. 2 is a schematic graph of power conversion efficiency of existing LEDs plotted against wavelength, showing how improvements relative to the prior art in the power conversion efficiency of the present green phosphor-based LEDs are able to better match the efficiencies of the red and blue LEDs.

The purpose of providing such configurations as those illustrated in FIGS. 1A-C, each of which employ the novel aluminate-based green phosphor, may be understood by referring to FIG. 2. FIG. 2 is a schematic graph of power conversion efficiencies of prior art LEDs and LEDs based on the present green phosphors plotted against the wavelength of the emitted light, showing the improvements relative to the prior art in the power conversion efficiency. With the improved efficiencies, LEDs based on the present green phosphors allow better matching of power conversion efficiencies of the red and blue phosphors and/or red and blue LEDs used in display applications.

Referring to FIG. 2, conversion efficiency has been plotted schematically on the vertical axis, where conversion efficiency is defined herein as the ratio of light emitted relative to electrical power input to the LED. Shown at reference numeral 20 is a typical efficiency of a blue LED, often about 40-50%, which is also about the same efficiency that a red LED typically demonstrates. The shape of the curve 21 in FIG. 2, however, shows that the power conversion of an LED decreases dramatically as it is altered to emit in longer wavelengths, in other words, the conversion efficiency decreases as wavelength is increased from the violet at 400 to the blue at 450, then to the green at 530, and finally to the yellow "gap" located at about 550 nm. Thus, the conversion efficiency of prior art green LEDs shown schematically at 22 in FIG. 2 is only about 20% of the efficiency that a typical blue LED achieves. Stated another way, an improvement in power conversion may be achieved using a green LED with the present green phosphors, and such an improvement is represented by the vertical bar at reference numeral 23. Such an enhancement of power conversion was not previously known in the art. The enhanced power conversions of the present embodiments may be seen with excitation sources comprising a near UV LED emitting excitation radiation at a wavelength of about 300 to 410 nm. In one embodiment of the present invention, the green phosphor has a quantum efficiency of about 80% and the near UV LED has a power conversion of about 40-50%; in this embodiment, the green phosphor LED will have a power conversion of 32-40%. This is about double the power conversions of the present GaN based green LED.

There are advantages to the display industry in general, and to RGB backlight applications in particular, of providing the inventive green phosphor LEDs, because then the power conversion efficiencies of all three red-green-blue (RGB) LEDs are better matched. Additional advantages are that only one green LED is needed in each RGB unit, instead of the two or more green LEDs that are sometimes required in current RGB display backlighting systems.

Embodiments of the present invention will be described in the following order: first, a general description of the novel aluminate-based phosphor will be presented, with a discussion of the alkaline earths content in the phosphor, and the effect the ratios of the alkaline earths have on luminescent properties. In particular, a discussion will be given of the relative amounts of the Mn and Mg alkaline earths represented by the formula $Mg_{1-x}Mn_xEuAl_{10}O_{17}$. Next, the emission properties of exemplary phosphors will be discussed for the exemplary compositions $M_{0.5}Mg_{0.5}EuAl_{10}O_{17}$, where M is one or more of Mn, Ca, Ba, Zn, with Mn having been replaced by alternative divalent alkaline earth elements. The excitation properties of the present compositions will also be discussed, again for the example where the ration of Mn and Mg is varied, and for the case where a divalent metal can be Mn, Ca, Ba, and Zn. Finally, phosphor processing and fabrication methods will be discussed.

The Alkaline Earth Content of the Present Green Phosphors

According to embodiments of the present invention, an aluminate-based green phosphor has the formula $M_{1-x}Eu_xAl_yO_{1+3y/2}$, where M is at least one of a divalent metal selected from the group consisting of Ba, Sr, Ca, Mg, Mn, Zn, Cu, Cd, Sm, and Tm. The relative contents of the divalent alkaline earth metals and europium is represented by $0.1<x<0.9$. The type of aluminate that serves as a host for the phosphor is represented by the stoichiometry $0.5<y<12$. According to embodiments of the present invention, an elevated europium content is present for activating the phosphor; that is to say, elevated contents relative to compositions in the prior art, as discussed below. A novel feature of the present aluminate-based green phosphor is that the europium content is greater than about 0.3 weight percent, where the calculation is made for the europium content as a function of the total weight of the europium to the divalent alkaline earth elements in the composition.

In one embodiment of the present invention, the aluminate-based phosphor may be described by the general formula given above, where $0.2 \leq x \leq 0.5$.

The aluminate-based phosphors of of the present invention are configured to absorb radiation in a wavelength ranging from about 280 nm to 420 nm, and emit visible light having a wavelength ranging from about 500 nm to 550 nm. In alternative embodiments, the phosphor emits visible light having a peak wavelength ranging from about 515 nm to 530 nm, or in a wavelength ranging from about 518 nm to 520 nm. The present aluminate-based green phosphors have a narrow peak emission wavelength range relative to prior phosphors, the phosphors of the present embodiments emitting visible light with a peak wavelength having a full width at half maximum of less than or equal to about 40 nm.

Figure 3:
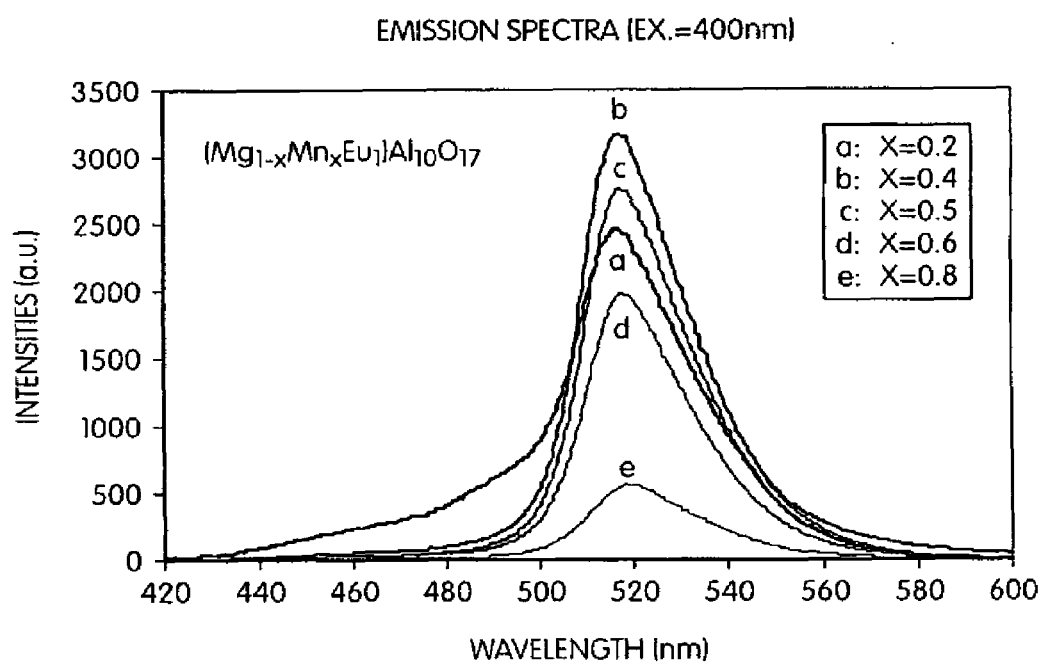
FIG. 3 is an emission spectra of a series of exemplary compositions according to present embodiments, in this case composition being $Mg_{1-x}Mn_xEuAl_{10}O_{17}$, wherein the relative amounts of the Mn and Mg have been varied; the figure showing that the peak emission wavelength of these exemplary compounds being around 520 nm.

The emission spectra of a series of exemplary compositions according to present embodiments is shown in FIG. 3 for the composition $Mg_{1-x}Mn_xEuAl_{10}O_{17}$, where the relative amounts of the Mn and Mg have been varied to show the effect of the content of these divalent alkaline earth elements. For example, starting with a composition having a relative content of about 20% Mn and 80% Mg (where the percentages represent the amounts of each alkaline earth as a percentage of the total amount of the divalent, alkaline earths present), a composition which displays an emission intensity intermediate in the series, the intensity increases as the relative content of the Mn to Mg is increased first to 50/50, and then to 40/60. This latter composition having a content of 40% Mn and 60% Mg displays the greatest emission intensity of the series. From here, the emission intensity decreases as the Mn content is further increased to 60% Mn and 40% Mg, and then even further still to 80% Mn and 20% Mg. It will be apparent to one skilled in the art that the wavelength of the peak emission for each of these compositions remained centered on a wavelength of about 520, regardless of the ratio of the magnesium to the manganese.

Figure 4A:
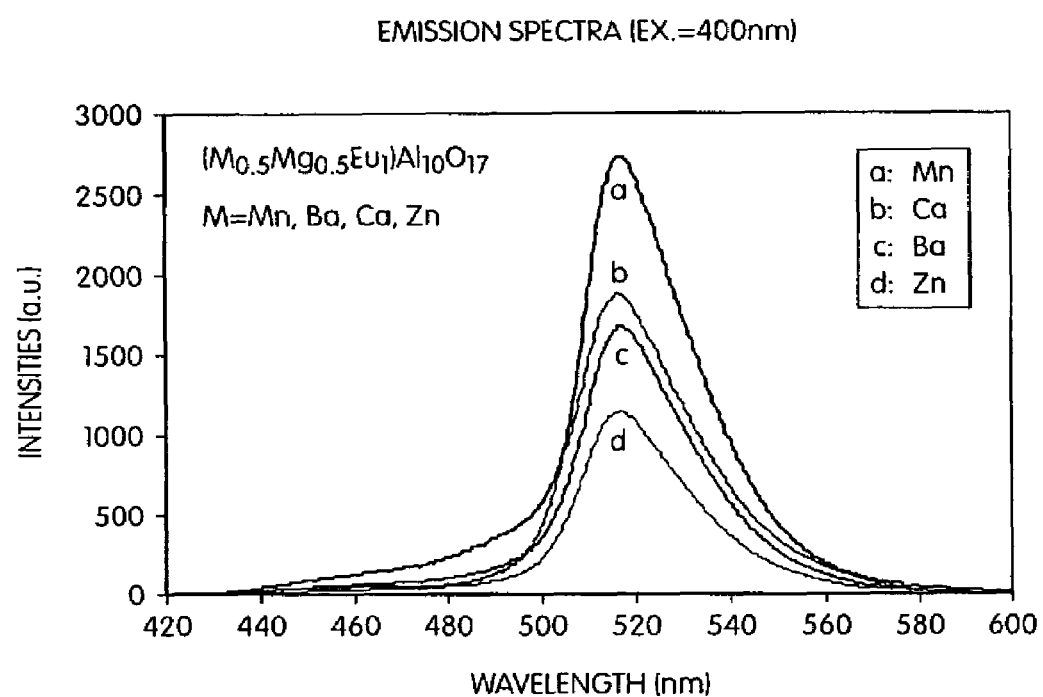
FIG. 4 is an emission spectra of a series of exemplary compositions represented generally by the formula $M_{0.5}Mg_{0.5}EuAl_{10}O_{17}$; where M is selected from the group consisting of Mn, Ca, Ba, Zn; the purpose of the graph being to show the effect of replacing Mn with alternative divalent alkaline earth elements.
Figure 4B:
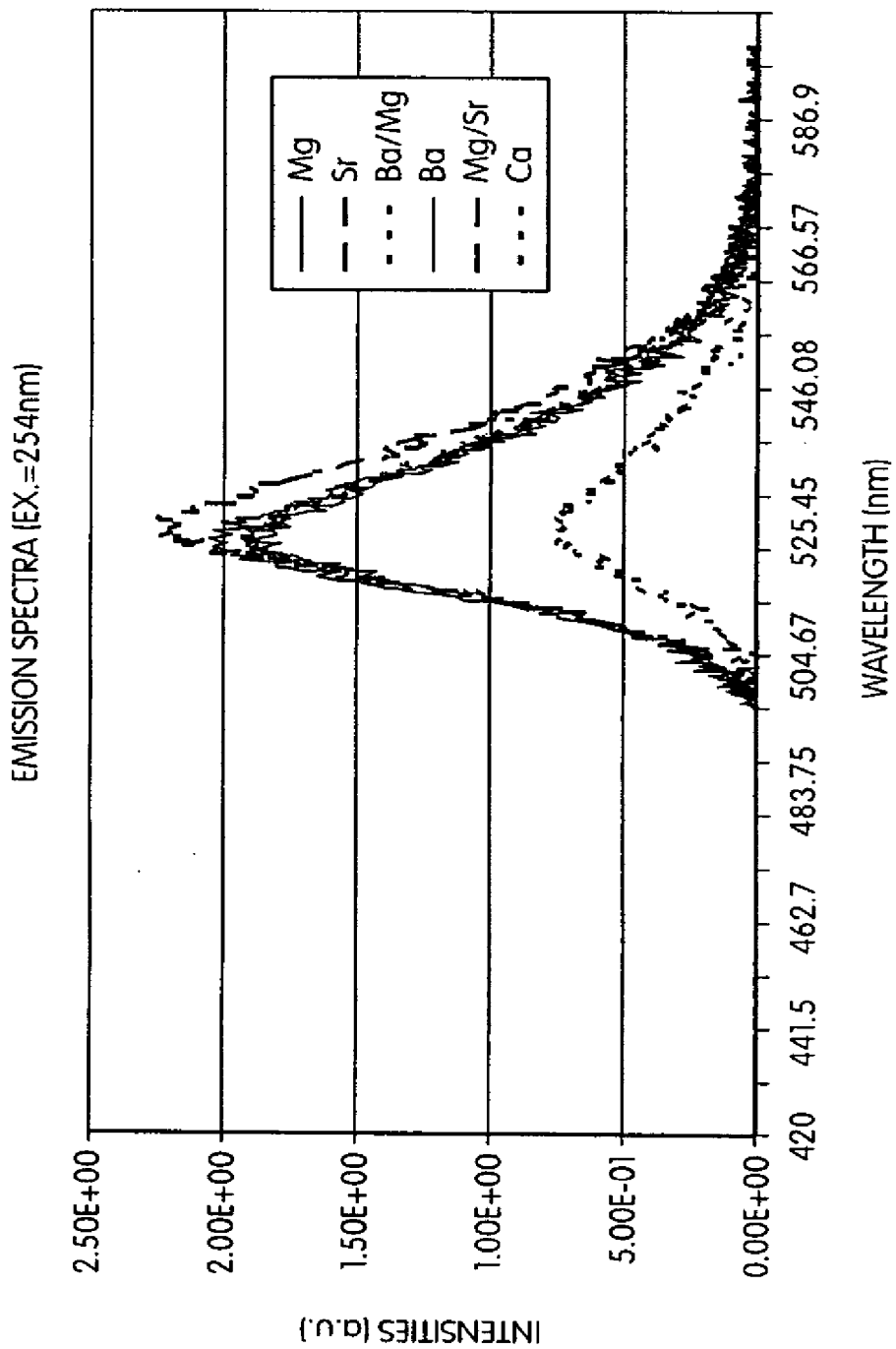
Figure 5A:
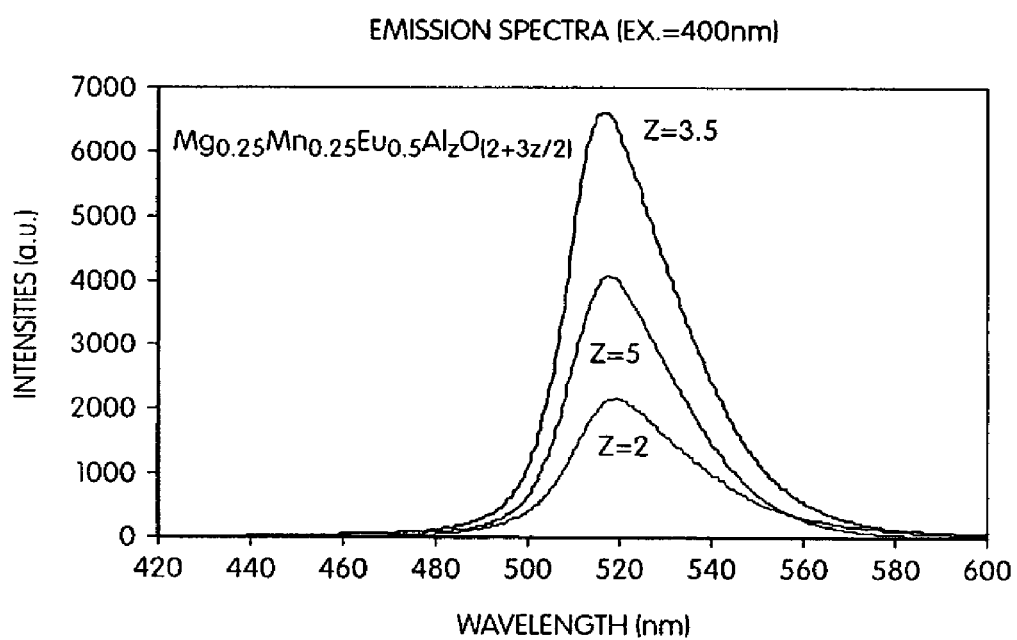
FIG. 5 is an emission spectra of a series of exemplary compositions represented by the formula $Mg_{0.25}Mn_{0.25}Eu_{0.5}Al_yO_{1.5y+1}$; where y shows the effect of changing the relative content of Al and O, thus influencing the host aluminate structure (note that this experiment is equivalent to changing the ratio of the aluminum to the bivalent alkaline earth elements)
Figure 5B:
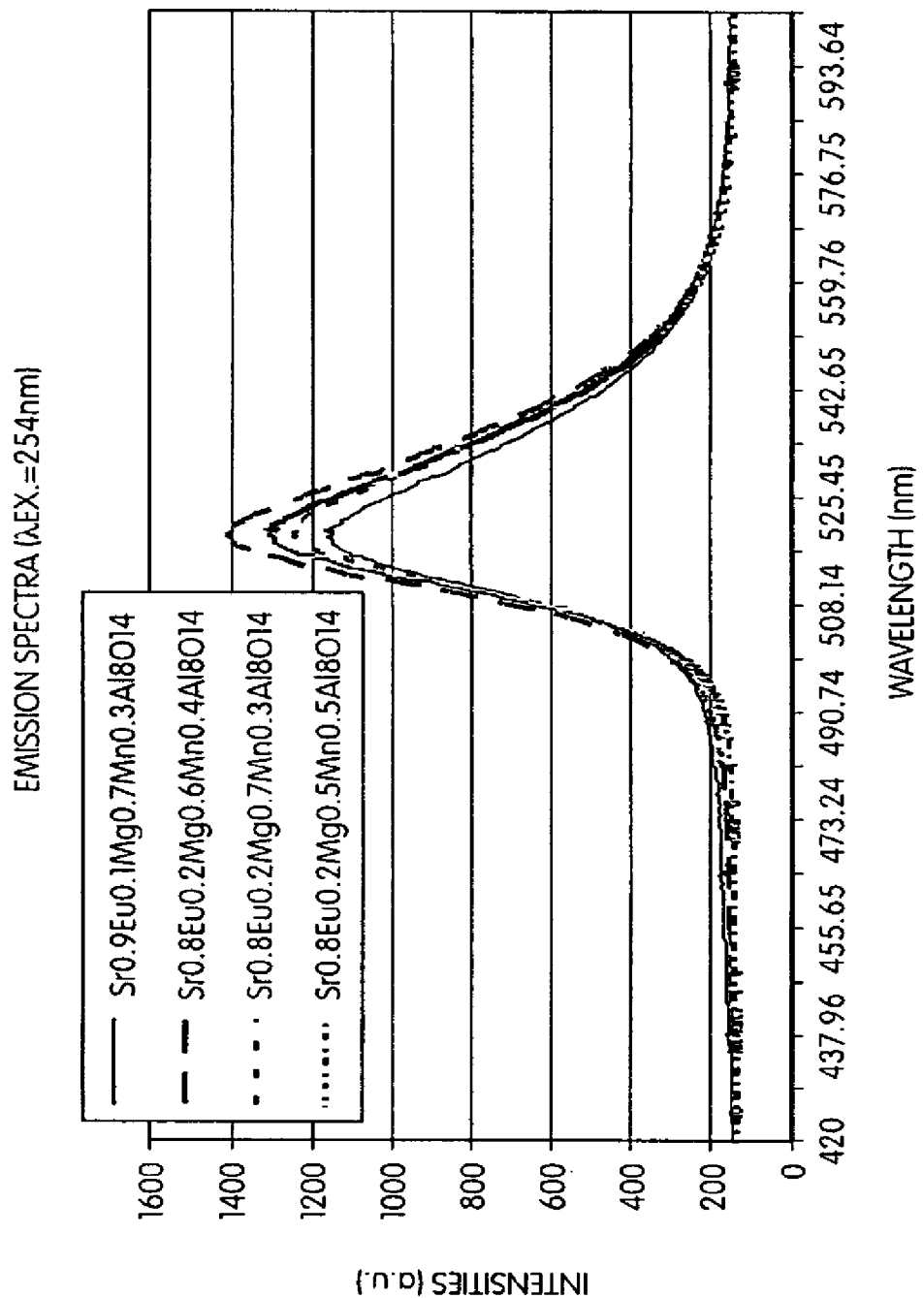

It will be clear to one skilled in the art that magnesium is an essential component of the present aluminate-based green phosphor compositions. Alternative replacements to the manganese component of the present phosphors, however, are Ca, Ba, and Zn. The results of substituting Ca, Ba, and Zn into the present compositions are shown in FIG. 4, which is an emission spectra of the phosphor represented by the formula $M_{0.5}Mg_{0.5}EuAl_{10}O_{17}$, when excited by 400 nm light. The order of emission intensity from the above mentioned elements is As in the previous case in FIG. 3, however, the peak emission intensity is centered on a wavelength of about 520 nm.

Aluminate Structures of the Present Green Phosphors

The present aluminate-based green phosphors may be based on a variety of different alluminate structures. In one embodiment of the present invention, the novel aluminate-based green phosphor has the formula $M_{1-x}Eu_xAl_yO_{1+3y/2}$; where y shows the effect of changing the relative content of Al and O, thus influencing the host aluminate structure. In this representation of the formula, the value of y is greater than or equal to 0.5, and less than or equal to 12. Note that this experiment is equivalent to changing the ratio of the aluminum to the bivalent alkaline earth elements.

It will be recognized by those skilled in the art that there are an infinite number of possibilities regarding the value of y, and hence aluminate structure, but a range of specific examples will be provived in this disclosure to illuminate the variety of structures that are possible. For example, y may take on the value of 0.67, 2, 3.5, 4, 5, 8, and 12. The following paragraphs illustrate the aluminate-based green phosphors that may originate from varying the value of y.

For example, an aluminate phosphor may be provided according to embodiments of the present invention where y is equal to two thirds, or about 0.67, such that the phosphor has the formula $(M_{1-x}Eu_x)_3Al_2O_6$. This phosphor has an aluminate structure different from other embodiments of the present invention.

Alternatively, the present aluminate phosphos may be provided according to embodiments of the present invention where y is equal 2, such that the phosphor has the formula $(M_{1-x}Eu_x)_3Al_2O_4$. This phosphor has an aluminate structure different from other embodiments of the present invention.

Alternatively, the present aluminate phosphos may be provided according to embodiments of the present invention where y is equal 3.5, such that the phosphor has the formula $(M_{1-x}Eu_x)_4Al_{14}O_{25}$. This phosphor has an aluminate structure different from other embodiments of the present invention.

Alternatively, the present aluminate phosphos may be provided according to embodiments of the present invention where y is equal 4, such that the phosphor has the formula $(M_{1-x}Eu_x)Al_4O_7$. This phosphor has an aluminate structure different from other embodiments of the present invention.

Alternatively, the present aluminate phosphos may be provided according to embodiments of the present invention where y is equal 5, such that the phosphor has the formula $(M_{1-x}Eu_x)_2Al_{10}O_{17}$. This phosphor has an aluminate structure different from other embodiments of the present invention.

Alternatively, the present aluminate phosphos may be provided according to embodiments of the present invention where y is equal 8, such that the phosphor has the formula $(M_{1-x}Eu_x)Al_8O_{13}$. This phosphor has an aluminate structure different from other embodiments of the present invention.

Alternatively, the present aluminate phosphos may be provided according to embodiments of the present invention where y is equal 12, such that the phosphor has the formula $(M_{1-x}Eu_x)Al_{12}O_{19}$. This phosphor has an aluminate structure different from other embodiments of the present invention.

Of course, it will be understood by those skilled in the art that any combination of the above aluminate structures may be present in the present green phosphors, and that the value of y in the above structures can take on any value between 0.5 and 12, inclusive. In other words, y does not have to take on integral values, nor does it have to be constant throughout any particular phosphor.

The Near-UV to Blue LED Radiation Source

In general, the aluminate-based green phosphors of the present embodiments are not particularly responsive to excitation radiation having wavelengths greater than about 420 nm, although silicate-based green phosphors simultaneously developed by the present inventors are responsive. According to the present embodiments, the near-UV to blue light emitting LED emits light that is substantially in the non-visible portion of the electromagnetic spectrum, for example, radiation having a wavelength up to about 420 nm. Such an LED may comprise any semiconductor diode based on a layering of suitable II-V, II-VI, or IV-IV semiconductors whose junctions have an emission wavelength of 420 nm and below. For example, the LED may contain at least one semiconductor layer based on GaN, ZnSe, or SiC semiconductors. The LED may also contain one or more quantum wells in the active region, if desired. Preferably, the LED active region may comprise a p-n junction comprising GaN, AlGaN and/or InGaN semiconductor layers. The p-n junction may be separated by a thin undoped InGaN layer or by one or more InGaN quantum wells. The LED may have an emission wavelength between 300 and 420 nm, preferably between 340 and 405 nm. For example, the LED may have the following wavelengths: 350, 355, 360, 365, 370, 375, 380, 390, or 405.

The near-UV to blue light emitting devices of the present embodiments are herein described generically as an "LED," but it will be understood by those skilled in the art that the source of excitation radiation may be at least one of (wherein it is contemplated to have several operating simultaneously) an LED, a laser diode, a surface emiting laser diode, a resonant cavity light emitting diode, an inorganic electroluminescence device and an organic electroluminescence device.

Figure 6:
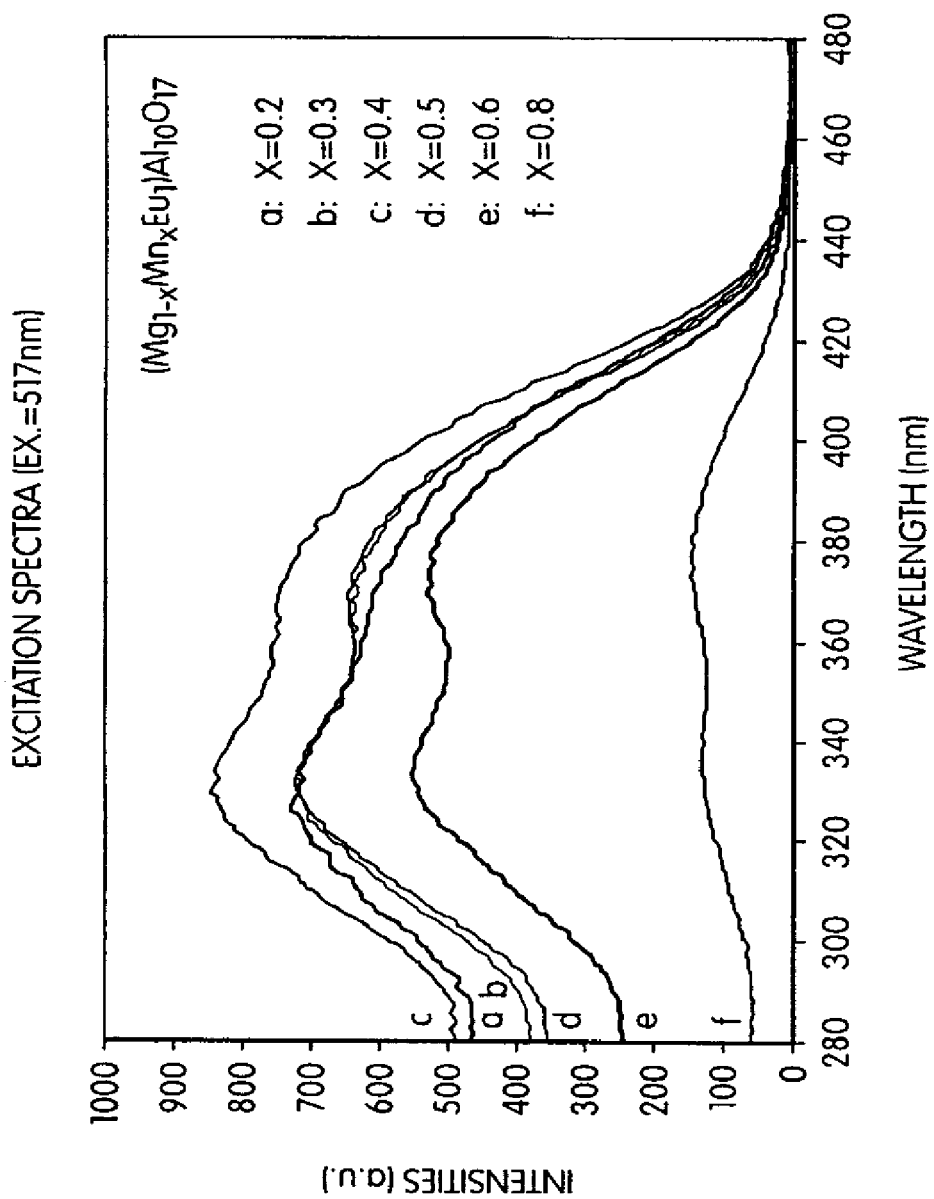
FIG. 6 is an excitation spectra of a series of exemplary compositions represented generally by the formula $Mg_{1-x}Mn_xEuAl_{10}O_{17}$, where the value of x ranges from about 0.2 to 0.8.
Figure 7:
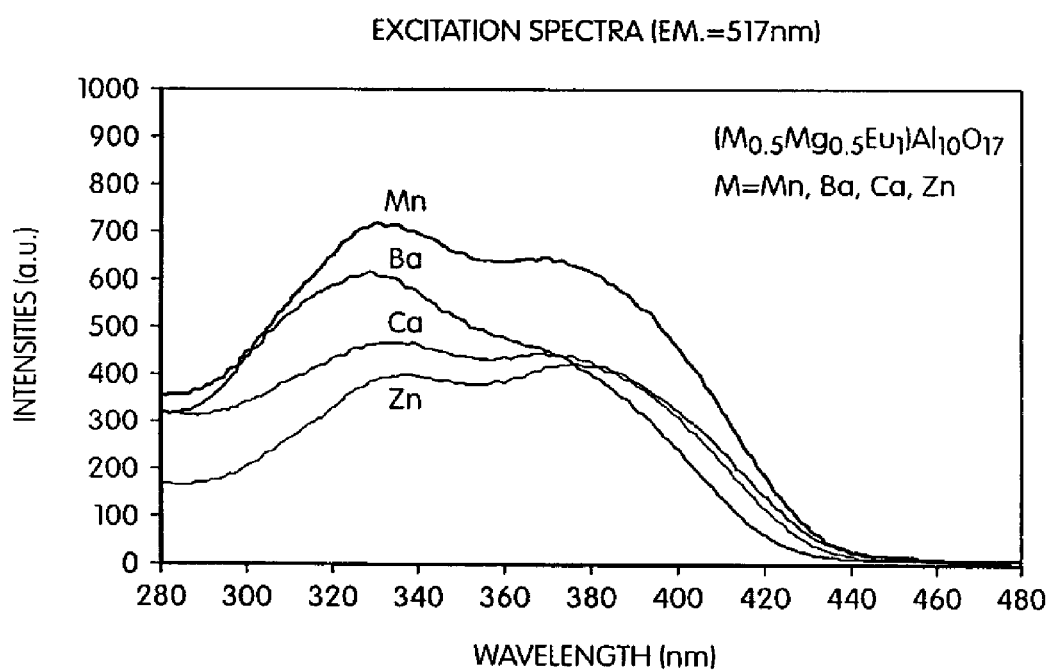
FIG. 7 is an excitation spectra of a series of exemplary compositions represented generally by the formula $(M_{0.5}Mg_{0.5}Eu)Al_{10}O_{17}$, where M is selected from the group consisting of Mn, Ba, Ca, and Zn.

An advantage of the present aluminate-based green phosphors is the wide range of wavelengths over which they are capable of being excited. These concepts are illustrated in FIGS. 6 and 7. Referring to FIG. 6, the emission spectra for a series of aluminate-based green phosphors having the formula $Mg_{1-x}Mn_xEuAl_{10}O_{17}$ is shown, for values of x that equal 0.2, 0.3, 0.4, 0.5, 0.6, and 0.8, respectively. It will be observed by one skilled in the art that these phosphors are capable of absorbing radiation between the wavelengths of about 280 and 420 nm, and thus are best suited to be used with a near-VV to blue LED that provides excitation in the non-visible portion of the electromagnetic spectrum. The peak of this absorption occurs at a wavelength of about 330 nm, although there is significant absorption over a wide range of wavelengths, the range extending from about 320 to 400 nm. The exemplary aluminate-based green phosphors in this experiment emitted green light at a wavelength of about 517 nm.

The data in FIG. 6 shows that the absorption is highest for a composition having a value of x of about 0.4; in other words, when 40 percent by atomic number of the divalent alkali metal content was manganese, and the remaining 60 percent magnesium. Absorption was also high (although not quite as high) for compositions with the atomic content of manganese ranging from about 20 to 60 percent.

The effect of varying the divalent alkali earth component of the present aluminate-based green phosphors is shown in FIG. 7. This series of phosphors could be described by the general formula $(M_{0.5}Mg_{0.5}Eu)Al_{10}O_{17}$, where M was either Mn, Ba, Ca, or Zn. Similar to the series of phosphors tested in FIG. 6, these compositions absorbed substantially non-visible radiation having a wavelength ranging from about 280 to 420 nm, with a peak absorption occuring at wavelengths ranging from about 320 to 400 nm.

The data in FIG. 7 shows that the absorption is highest for a composition having manganese as a divalent alkali earth element paired with magnesium, with the absorption decreasing in the order of barium, calcium, and zinc.

Blue and Red LEDs of an RGB Backlighting Display

Many blue phosphors known in the art may be used in conjunction with the present aluminate-based green phosphors to construct RBG backlightlighting displays. Divalent europium activated barium magnesium aluminate (BAM) phosphors may be used in conjunction with the aluminate-based green phosphors of the present invention RGB backlighting applications. An example of a BAM phosphor that may be used with the present green phosphors is disclosed in U.S. Pat. No. 4,110,660, where a blend containing $BaF_2$, LiF, $Al(OH)_3$, and $Eu_2O_3$ was fired in a hydrogen atmosphere in the temperature range of 1400 to 1650° F. for a period of 3 to 6 hours. Another known blue phosphor which may be used with the present green phosphor has been described in U.S. Pat. No. 4,161,457 to K. Takahashi. This particular phosphor is represented by the formula $aMgO \cdot bBaO \cdot cAl_2O_3 \cdot dEuO$, wherein a, b, c, and d are numbers which satisfy the condition $a+b+c+d=10$, and wherein $0 < a \leq 2.00$; $0.25 \leq b \leq 2.00$; $6.0 \leq c \leq 8.5$; $0.05 \leq d \leq 0.30$. Of course, it will be recognized by those skilled in the art that many other blue phosphor compositions similar to that of K. Takahashi may be used with the present green phosphors.

Other blue phosphors which may be used in conjunction with the present green phosphors in RGB blacklighting displays are exemplified by the lanthanum phosphate phosphors that use trivalent Tm as an activator, $Li^+$ and an optional amount of an alkaline earth element as a coactivator, as disclosed by R. P. Rao in U.S. Pat. No. 6,187,225. Such exemplary blue phosphors may be represented by the formula $(La_{1-x-z}Tm_xLi_yAE_z)PO_4$, where $0.001 \leq x \leq 0.05$; $0.01 \leq y \leq 0.05$; and $0 \leq z \leq 0.05$. More specifically, blue phosphors employing Tm3+ and Li+ doped lanthanum phosphate phosphors, particularly when produced by the sol-gel/xerogel and solid state methods are considered to be a part of the present invention.

In another embodiment, the blue phosphors of the present invention may comprise a compound generally represented by the formula $(Ba_xM_{1-x})_{1-0.25y}Mg_{1-y}Al_{10+y}O_{17+0.25y}$ as a host material, with Eu as an activator, and wherein M represents Ca, Sr, or Ca and Sr. Such a blue phosphor has been described by K. Ono et al. in U.S. Pat. No. 6,576,157, where the stoichiometric amounts of the constituent elements were represented by the relations $0.5 \leq x \leq 1$, and $0.05 \leq y \leq 0.15$, and where the phosphor was excited by vacuum ultraviolet radiation.

Multiphase structured $Eu^{2+}$ activated La, Mg aluminate phosphors have been prepared. U.S. Pat. No. 4,249,108 reveals that the starting materials $La_2O_3$, MgO, $Al(OH)_3$, and $Eu_2O_3$ may be fired at about 1500 to 1650° C. for about 1 to 5 hours in a reducing atmosphere. Additional blue phosphors that may be used with the present green phosphors include those disclosed in U.S. Pat. No. 5,611,959, where aluminate phosphors were taught comprising at least one element selected from the group consisting of Ba, Sr, and Ca; a Eu activator; Mg and/or Zn; and optionally Mn. This phosphor may be prepared by firing the respective oxides and/or hydroxides in a reducing atmosphere at a temperature of 1200 to 1700° C. over a period of 2 to 40 hours.

The red phosphor may be selected from the group consisting of $CaS:Eu^{2+}$, $SrS:Eu^{2+}$, $MgO*MgF*GeO:Mn^{4+}$, and $M_xSi_yN_z:Eu^{+2}$, where M is selected from the group consisting of Ca, Sr, Ba, and Zn; $Z=2/3x+4/3y$, and wherein the red phosphor is configured to absorb at least a portion of the radiation from the radiation source and emit light with peak intensity in a wavelength ranging from about 590 to 690 nm.

White Light LED Illumination Systems

The green phosphors of the present embodiments may comprise part of a white LED system. One or more radiation sources may be employed in such a system. For example, a near-UV or substantially non-visible radiation source may be used to excite the present aluminate-based green phosphors described above, and this same or a second radiation source may be used to excite any of (in combination or alone) a red, blue, blue-green, or yellow phosphor. The second radiation source may be a different a near-UV, substantially non-visible radiation source emitting at about 380 to 420 nm, for exciting any or all of the red, blue, blue-green, or yellow phosphors, or it may be a blue-LED emitting wavelengths 400 nm and longer, again for exciting any or all of the red, blue, blue-green, or yellow phosphors. For example, the second radiation source may emit radiation having a wavelength ranging from about 410 to 500 nm. In any event, the green phosphor is configured to absorb at least a portion of the radiation from a non-visible radiation source and emit light with peak intensity in a wavelength ranging from about 500 to 550 nm.

The yellow phosphors that may be used in such a white light LED illumination system have been described in two previous disclosures by the present inventors. These are U.S. patent application "Novel Phosphor Systems for a White Light Emitting Diode (LED)," filed Aug. 4, 2004 (attorney docket number 034172-011), and U.S. patent application "Novel Silicate-Based Yellow-Green Phosphors," filed Sep. 22, 2004 (attorney docket 034172-014), both of which are incorporated herein by reference. The yellow phosphor is configured to absorb at least a portion of the radiation from the radiation source, and emit light with peak intensity in a wavelength ranging from about 530 to 590 nm.

Phosphor Fabrication Processes

Methods of fabricating the novel aluminate-based phosphors of the present embodiments are not limited to any one fabrication method, but may, for example, be fabricated in a three step process that includes: 1) blending starting materials, 2) firing the starting material mix, and 3) various processes to be performed on the fired material, including pulverizing and drying. The starting materials may comprise various kinds of powders, such as alkaline earth metal compounds, aluminum compounds, and europium compounds. Examples of the alkaline earth metal compounds include alkaline earth metal carbonates, nitrates, hydroxides, oxides, oxalates, and halides. Examples of aluminum-containing compounds include its nitrates, fluorides and oxides. Examples of europium compounds include europium oxide, europium fluoride, and europium chloride.

The starting materials are blended in a manner such that the desired final composition is achieved. In one embodiment, for example, the alkaline-earth, aluminum-containing compounds (and/or germanium), and europium compounds are bended in the appropriate ratios, and then fired to achieve the desired composition. The blended starting materials are fired in a second step, and to enhance the reactivity of the blended materials (at any or various stages of the firing), a flux may be used. The flux may comprise various kinds of halides and boron compounds, examples of which include strontium fluoride, barium fluoride, calcium fluoride, europium fluoride, ammonium fluoride, lithium fluoride, sodium fluoride, potassium fluoride, strontium chloride, barium chloride, calcium chloride, europium chloride, ammonium chloride, lithium chloride, sodium chloride, potassium chloride, and combinations thereof. Examples of boron-containing flux compounds include boric acid, boric oxide, strontium borate, barium borate, and calcium borate.

In some embodiments, the flux compound is used in amounts where the number of mole percent ranges from between about 0.01 to 0.2 mole percent, where values may typically range from about 0.01 to 0.1 mole percent, both inclusive.

Various techniques for mixing the starting materials (with or without the flux) include using a motar, mixing with a ball mill, mixing using a V-shaped mixer, mixing using a cross rotary mixer, mixing using a jet mill and mixing using an agitator. The starting materials may be either dry mixed or wet mixed, where dry mixing refers to mixing without using a solvent. Solvents that may be used in a wet mixing process include water or an organic solvent, where the organic solvent may be either methanol or ethanol.

The mix of starting materials may be fired by numerous techniques known in the art. A heater such as an electric furnace or gas furnace may be used for the firing. The heater is not limited to any particular type, as long as the starting material mix is fired at the desired temperature for the desired length of time. In some embodiments, firing temperatures may range from about 800 to 1600° C. The firing time may range from about 10 minutes to 1000 hours. The firing atmosphere may be selected from among air, a low-pressure atmosphere, a vacuum, an inert-gas atmosphere, a nitrogen atmosphere, an oxygen atmosphere, an oxidizing atmosphere, and/or the compositions may be fired in a reducing atmosphere at 100 to 1600° C. for about 2 to 10 hours.

One method of preparing an aluminate-based green phosphor is directed to preparing a green phosphor having the formula $M_{1-x}Eu_xAl_yO_{1+3y/2}$, wherein M is at least one of a divalent metal selected from the group consisting of Ba, Sr, Ca, Mg, Mn, Zn, Cu, Cd, Sm, and Tm; where $0.1<x<0.9$; and $2<y<12$. The method of preparing the phosphor may be either one of a sol-gel method or a solid reaction method. In this method, a metal nitrate may be used to provide the divalent metal component of the green phosphor, as well as the the aluminum component of the aluminate-based green phosphor. The metal nitrate that supplies the divalent metal component may be $Ba(NO_3)_2$, $Mg(NO_3)_2$, or $Mn(NO_3)_2$, and the metal nitrate that provides the aluminum may be $Al(NO_3)_3$.

This method further comprises the step of using a metal oxide to provide the oxygen component of the aluminate-based green phosphor.

An example of the method comprises the following steps:

a) providing raw materials selected from the group consisting of $Ba(NO_3)_2$, $Mg(NO_3)_2$, $Mn(NO_3)_2$, $Al(NO_3)_3$, and $Eu_2O_3$;

b) dissolving the Eu2O3 in a nitric acid solution, and then mixing a desired amount of the metal nitrates to form an aqueous-based nitrate solution;

c) heating the solution of step c) to form a gel;

d) heating the gel of step d) to about 500-1000° C. to decompose the nitrate mixture to an oxide mixture;

e) sintering the powder of step f) in reducing atmosphere about 1000° C. to 1500° C. for about 1-10 hours.

Next, a generalized description of the CEE diagram will be given, along with a description of where the present yellow-green phosphors appear on the CIE diagram.

Chromaticity Coordinates on a CIE Diagram, and the CRI

Color quality can be measured by a number of different rating systems. Chromaticity defines color by hue and saturation. CIE is a chromaticity coordinate system developed by the Commission International de l'Eclairage (international commission of illumination). The CIE Chromaticity Coordinates are coordinates that define a color in "1931 CIE" color space. These coordinates are defined as x, y, z, and are ratios of the three standard primary colors X, Y, Z (tristimulus values) in relation to the sum of the three tristimulus values. A CIE chart contains a plot of the x, y, and z ratios of the tristimulus values versus their sum. In the situation where the reduced coordinates x, y, and z add to 1, typically, a two-dimensional CEE (x, y) plot is used.

For the display applications relevant to the present green phosphors, color space is independent of the red, green, and blue light components in terms of their location in color space. The green phosphors of the present embodiments are particularly useful in generating the larger color spaces advantageous for RGB backlighting displays, referred to in the art as "wide color gamut displays." According to one embodiment of the present invention, the aluminate-based green phosphors have color coordinates of x=0.193 and y=0.726. Color coordinates in this range of values clearly have advantages for the display industry.

Many modifications of the exemplary embodiments of the invention disclosed above will readily occur to those skilled in the art. Accordingly, the invention is to be construed as including all structure and methods that fall within the scope of the appended claims.

What is claimed is:

1. An aluminate-based green phosphor having the formula $M_{1-x}Eu_xAl_yO_{1+3y/2}$, wherein:

M is at least one of a divalent metal selected from the group consisting of Ba, Sr, Ca, Mg, Mn, Zn, Cu, Cd, Sm, and Tm; where $0.1 < x < 0.9$; and $0.5 \leq y \leq 12$;

wherein the phosphor is configured to absorb radiation in a wavelength ranging from about 280 nm to 420 nm, and to emit visible light having a wavelength ranging from about 500 nm to 550 nm;

subject to the proviso that compositions of the formula $M_{1-x}Eu_xAl_2O_4$, $(M_{1-x}Eux)_4Al_{14}O_{25}$, and $(M_{1-x}Eu_x)_2Al_{10}O_{17}$ are specifically excluded.

2. The aluminate-based phosphor of claim 1; where $0.3 \leq x \leq 0.6$.

3. The aluminate-based phosphor of claim 1, wherein the phosphor emits visible light having a peak wavelength ranging from about 515 nm to 530 nm.

4. The aluminate-based phosphor of claim 1, wherein the phosphor emits visible light with a peak wavelength having a full width at half maximum of less than or equal to about 40 nm.

5. The aluminate-based phosphor of claim 1, wherein the formula of the phosphor is $M_{1-x-w}Mg_wEu_xAl_yO_{1+3y/2}$; and where $0 < w < 1$.

6. A green phosphor-based LED comprsing:

a radiation source configured to emit radiation having a wavelength ranging from about 280 to 420 nm;

a green phosphor according to claim 1, the green phosphor configured to absorb at least a portion of the radiation from the radiation souce and emit green light with a peak intensity in a wavelength ranging from about 500 to 550 nm.

7. A white LED comprising:

a radiation source configured to emit radiation having a wavelength ranging from about 410 to 500 nm;

a green phosphor according to claim 1, the green phosphor configured to absorb at least a portion of the radiation from the radiation source and emit light with peak intensity in a wavelength ranging from about 500 to 550 nm; and a yellow phosphor configured to absorb at least a portion of the radiation from the radiation source and emit light with peak intensity in a wavelength ranging from about 530 to 590 nm.

8. A white LED comprising:

a radiation source configured to emit radiation having a wavelength ranging from about 410 to 500 nm;

a green phosphor according to claim 1, the green phosphor configured to absorb at least a portion of the radiation from the radiation source and emit light with peak intensity in a wavelength ranging from about 500 to 550 nm; and a red phosphor selected from the group consisting of CaS:$Eu^{2+}$, SrS:$Eu^{2+}$, MgO*MgF*GeO:$Mn^{4+}$, and $M_xSi_yN_z$:$Eu^{2+}$, where M is selected from the group consisting of Ca, Sr, Ba, and Zn; $Z=2/3x+4/3y$, wherein the red phosphor is configured to absorb at least a portion of the radiation from the radiation source and emit light with peak intensity in a wavelength ranging from about 590 to 690 nm.

9. An aluminate-based green phosphor having the formula $(M_{1-x}Eu_x)_4Al_{14}O_{25}$, wherein:

M is at least one of a divalent metal selected from the group consisting of Ba, Ca, Mg, Mn, Zn, Cu, Cd, Sm, and Tm: where $0.1 < x < 0.9$; and wherein the phosphor is configured to absorb radiation in a wavelength ranging from about 280 nm to 420 nm, and to emit visible light having a wavelength ranging from about 500 nm to 550 nm.

10. An aluminate-based green phosphor having the formula $Mn_{1-x-w}Mg_wEu_xAl_yO_{1+3y/2}$, wherein:

$0 < w < 1$ $0.1 < x < 0.9$;

$0.5 \leq y \leq 12$; and wherein the phosphor is configured to absorb radiation in a wavelength ranging from about 280 nm to 420 nm, and to emit visible light having a wavelength ranging from about 500 nm to 550 nm.

11. An aluminate-based green phosphor having the formula $Mn_{0.5-w}Mg_wEu_{0.5}Al_yO_{1+3y/2}$; where $0.5 \leq w \leq 0.5$; and $2 \leq y \leq 5$.

wherein the phosphor is configured to absorb radiation in a wavelength ranging from about 280 nm to 420 nm, and to emit visible light having a wavelength ranging from about 500 nm to 550 nm.

12. An aluminate-based green phosphor having the formula $Mn_{0.5-w}Mg_wEu_{0.5}Al_yO_{1+3y/2}$; where
   w=0.25; and
   $2\leq y \leq 5$;
   wherein the phosphor is configured to absorb radiation in a wavelength ranging from about 280 nm to 420 nm, and to emit visible light having a wavelength ranging from about 500 nm to 550 nm.

13. An aluminate-based green phosphor having the formula $Mn_{1-x-w}Mg_wEu_xAl_yO_{1+y/2}$ with y=3.5, such that the formula of the phosphor is $Mn_{0.5-w}Mg_wEu_{0.5}Al_{3.5}O_{6.25}$, where 0<w<1; and
   wherein the phosphor is configured to absorb radiation in a wavelength ranging from about 280 nm to 420 nm, and to emit visible light having a wavelength ranging from about 500 nm to 550 nm.

14. A display device selected from the group consisting of an RGB backlight display, a television, a monitor, a cell phone, a PDA, a navigation display, a game, a decorative light, a sign, the display device comprising an aluminate-based green phosphor having the formula $M_{1-x}Eu_xAl_yO_{1+3y/2}$, wherein:
   M is at least one of a divalent metal selected from the group consisting of Ba, Sr, Ca, Mg, Mn, Zn, Cu, Cd, Sm, and Tm; where
   0.1<x<0.9; and
   $0.5\leq y \leq 12$;
   wherein the phosphor is configured to absorb radiation in a wavelength ranging from about 280 nm to 420 nm, and to emit visible light having a wavelength ranging from about 500 to 550 nm;
   subject to the proviso that compositions of the formula $M_{1-x}Eu_xAl_2O_4$, $(M_{1-x}Eu_x)_4Al_{14}O_{25}$, and $(M_{1-x}Eu_x)_2Al_{10}O_{17}$ are specifically excluded.

15. A method of preparing an aluminate-based green phosphor having the formula $M_{1-x}Eu_xAl_yO_{1+3y/2}$, wherein M is at least one of a divalent metal selected from the group consisting of Ba, Sr, Ca, Mg, Mn, Zn, Cu, Cd, Sm, and Tm; and where
   0.1<x<0.9; and
   $0.5\leq y \leq 12$;
   the method selected from the group consisting of a sol-gel method and a solid reaction method;
   subject to the proviso that compositions of the formula $M_{1-x}Eu_xAl_2O_4$, $(M_{1-x}Eu_x)_4Al_{14}O_{25}$, and $(M_{1-x}Eu_x)_2Al_{10}O_{17}$ are specifically excluded.

16. The method of claim 15, further comprising the step of using a metal nitrate to provide the divalent metal component of the green phosphor.

17. The method of claim 15, further comprising the step of using a metal nitrate to provide the metal components of the aluminate-based green phosphor.

18. The method of claim 17, wherein the metal nitrate is selected from the group consisting of $Al(NO_3)_3$, $Ba(NO_3)_2$, $Mg(NO_3)_2$, and $Mn(NO_3)_2$.

19. The solid reaction method of claim 15, further comprising the step of using a metal oxide to provide both metal and oxygen components of the aluminate-based green phosphor for calcinations and sintering processes.

* * * * *